US011320856B2

(12) United States Patent
Magargee et al.

(10) Patent No.: US 11,320,856 B2
(45) Date of Patent: May 3, 2022

(54) DISPLAY SYSTEMS AND DEVICES

(71) Applicant: 3M INNOVATIVE PROPERTIES COMPANY, St. Paul, MN (US)

(72) Inventors: James K. Magargee, St. Paul, MN (US); Jacob T. Lusson, Richfield, MN (US); Alonso M. Hernandez, Minneapolis, MN (US); Scott A. Spoo, Deer Park, WI (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 0 days.

(21) Appl. No.: 17/258,585

(22) PCT Filed: Jul. 12, 2019

(86) PCT No.: PCT/US2019/041542
§ 371 (c)(1),
(2) Date: Jan. 7, 2021

(87) PCT Pub. No.: WO2020/014573
PCT Pub. Date: Jan. 16, 2020

(65) Prior Publication Data
US 2021/0232178 A1 Jul. 29, 2021

Related U.S. Application Data

(60) Provisional application No. 62/697,453, filed on Jul. 13, 2018.

(51) Int. Cl.
*G06F 1/16* (2006.01)
*G06F 1/18* (2006.01)
*B43L 1/00* (2006.01)

(52) U.S. Cl.
CPC ............ *G06F 1/1611* (2013.01); *B43L 1/008* (2013.01); *G06F 1/181* (2013.01)

(58) Field of Classification Search
CPC ...... G06F 1/1611; G06F 1/181; G06F 1/1607; B43L 1/008
See application file for complete search history.

(56) References Cited

U.S. PATENT DOCUMENTS 4,852,282 A  8/1989  Selman
4,960,257 A  10/1990 Waters
(Continued)

FOREIGN PATENT DOCUMENTS

CN  2611981  4/2004
CN  2792791  7/2006
(Continued)

OTHER PUBLICATIONS

International Search Report for PCT International Application No. PCT/IB2019/041542, dated Oct. 30, 2019, 4 pages.
(Continued)

*Primary Examiner* — Rockshana D Chowdhury
(74) *Attorney, Agent, or Firm* — 3M IPC

(57) ABSTRACT

The present disclosure generally relates to display systems, display devices, and methods of making and using them. Some exemplary display systems are capable of attaching a display device to a computer monitor. The exemplary display systems sought to create improved display systems and devices capable of displaying information to a user and attaching to a computer monitor and/or large format electronic display.

20 Claims, 3 Drawing Sheets

(56) References Cited

U.S. PATENT DOCUMENTS

| | | | |
|---|---|---|---|
| 5,082,235 | A | 1/1992 | Crowther |
| 5,342,665 | A | 8/1994 | Krawitz |
| 5,620,162 | A | 4/1997 | Beckwith |
| 6,151,206 | A | 11/2000 | Kato |
| 6,686,900 | B1 | 2/2004 | Levy |
| 6,837,715 | B2 | 1/2005 | Beno |
| 6,888,940 | B1 * | 5/2005 | Deppen ............... B60R 11/0241 379/454 |
| 7,542,270 | B2 | 6/2009 | Chen |
| 7,864,514 | B2 | 1/2011 | Lee |
| 8,672,687 | B2 | 3/2014 | Shanbour |
| 8,988,876 | B2 | 3/2015 | Corbin |
| 9,441,782 | B2 * | 9/2016 | Funk ...................... F16M 13/00 |
| 9,494,980 | B2 | 11/2016 | Corbin |
| 9,527,336 | B2 | 12/2016 | Mahli |
| 9,905,964 | B2 | 2/2018 | Degner |
| 10,078,346 | B2 * | 9/2018 | Lay ......................... F16M 11/38 |
| 10,237,384 | B2 * | 3/2019 | Holder ..................... H04M 1/04 |
| 10,429,884 | B1 * | 10/2019 | Brittingham .......... G06F 1/1611 |
| 10,736,407 | B1 * | 8/2020 | Jin ........................... H04M 1/04 |
| 2001/0009500 | A1 | 7/2001 | Selker |
| 2001/0013187 | A1 | 8/2001 | Dwyer |
| 2004/0131815 | A1 | 7/2004 | Maggio |
| 2006/0059747 | A1 | 3/2006 | Wescott |
| 2008/0019087 | A1 | 1/2008 | Chen |
| 2009/0068632 | A1 | 3/2009 | Thompson |
| 2011/0192857 | A1 | 8/2011 | Rothbaum |
| 2012/0118770 | A1 | 5/2012 | Valls |
| 2013/0157246 | A1 | 6/2013 | Shapiro |
| 2013/0164730 | A1 | 6/2013 | Gustafson |
| 2013/0200228 | A1 | 8/2013 | Costas |
| 2015/0301559 | A1 * | 10/2015 | Wu ....................... F16M 13/022 248/229.16 |
| 2016/0052329 | A1 | 2/2016 | Haymond |
| 2016/0166060 | A1 | 6/2016 | Emery |
| 2016/0260532 | A1 * | 9/2016 | Baca ...................... H01F 7/0252 |
| 2017/0264725 | A1 * | 9/2017 | Holder .................... H04M 1/04 |
| 2017/0269634 | A1 | 9/2017 | Ji |
| 2017/0328517 | A1 * | 11/2017 | Wessels ................. F16M 13/00 |
| 2018/0008044 | A1 * | 1/2018 | Holt ....................... G06F 1/1605 |
| 2018/0027982 | A1 | 2/2018 | Mazzeo |
| 2021/0137270 | A1 * | 5/2021 | Holt ...................... H04N 5/2257 |
| 2021/0232178 | A1 * | 7/2021 | Magargee ............... B43L 1/008 |

FOREIGN PATENT DOCUMENTS

| | | |
|---|---|---|
| CN | 203025684 | 6/2013 |
| CN | 204314853 | 5/2015 |
| CN | 104820467 | 8/2015 |
| CN | 207249641 | 4/2018 |
| DE | 19806312 | 8/1999 |
| DE | 20104880 | 6/2001 |
| DE | 20303576 | 10/2003 |
| DE | 202012009464 | 1/2013 |
| JP | H10287091 A * | 10/1998 |
| JP | 2006-035822 | 2/2006 |
| JP | 5852182 | 2/2016 |
| JP | 2018-045158 | 3/2018 |
| KR | 20-0245004 | 10/2001 |
| KR | 2009-0070185 | 7/2009 |
| KR | 10-1453196 | 10/2014 |
| KR | 10-1472204 | 12/2014 |
| KR | 10-1472213 | 12/2014 |
| WO | WO 2009-105944 | 9/2009 |

OTHER PUBLICATIONS

"PIXO-Magnetic tablet mount for desktop computers", Themethodcase [Online], Apr. 7, 2016 [retrieved from the internet on Mar. 12, 2021], URL<https://www.themethodcase.com/pixo-tablet-mount-oscar-diaz>, 5 pages.

Product Brochure, "Verb Whiteboard", a product of Steelcase, 2015, URL <https://www.steelcase.com/products/whiteboards/verb-whiteboard/>, 11 pages.

Product Information, "Desktop Organizer Justick™ Desktop—JB 100", a product of Justick, (date unknown but believed to be prior to the date of the filing of the present application), [retrieved from the internet on Mar. 12, 2021], URL<http://justick.com/products/>, 1 page.

Product Information, "Dockem DuoScreen Laptop Mount with Upgraded Grip Compatible with iPad and Tablets: Stand for Dual Display Setup: Dock to Laptop or UltraBook: Bracket Connects Tablet/Smartphone (Black)", a product of Dockem, (date unknown but believed to be prior to the date of the filing of the present application), [retrieved from the internet on Mar. 12, 2021], URL<https://www.amazon.com/DuoScreen-iPad-Monitor-Mount-Upgraded/dp/B07575TQKC>, 3 pages.

Product Information: "I-Spire Series™ Document Lift", a product of Fellowes, (date unknown but believed to be prior to the date of the filing of the present application), [retrieved from the internet on Mar. 12, 2021], URL<http://www.fellowes.com/US/en/Products/Pages/product-details.aspx?prod=US-9472601&cat=OFFICE-WELL-BEING&subcat =WORKSPACE_ERGO&tercat=COPY HOLDERS>, 1 page.

Product Information, "Mountie by Ten One Design—Mount Your Smartphone or Tablet to Your Laptop—an Instant Second Display for Your Computer Monitor (2015 Version) -Green" 2015, [retrieved from the internet on Mar. 12, 2021], URL <https://www.amazon.com/Mountie-Ten-One-Design-T1-MULT-108/dp/B00S74HGMG>, 4 pgs.

Product Information: "Office Suites™ Monitor Mount Copyholder", a product of Fellowes, (date unknown but believed to be priorto the date of the filing of the present application), [retrieved from the internet on Mar. 12, 2021], URL<http://www.fellowes.com/US/en/Products/Pages/product-details.aspx?prod=US-8033301&cat=OFFICE-WELL-BEING&subcat=WORKSPACE_ERGO&tercat=COPY_HOLDERS>, 1 pg.

Product Information: "Quartet Glass Dry-Erase Desktop Computer Pad, 18" x 6", White Surface, Frameless", a product of Quartet, (Jul. 21, 2017), URL<https://www.quartet.com/us/us/2314/gdp186/quartet-glass-dryerase-desktop-computer-pad-18-x-6-white-surface-frameless>.

Product Information: "Quartet Glass Dry-Erase Desktop Easel, 9" X 11", White Surface, Frameless", a product of Quartet; (Jul. 21, 2017), URL<https://www.quartet.com/us/us/2314/gde119/quartet-glass-dryerase-desktop-easel-9-x-11 -white-surface-frameless>.

Product Information, "Victor® Monitor Document Holder, 3 3/8" x 1/8" x 11 7/8", Graphite Gray (DH012)", a product of Staples, (date unknown but believed to be prior to the date of the filing of the present application), [retrieved from the internet on Mar. 12, 2021], URL<https://www.staples.com/Victor-Monitor-Document-Holder-3-3-8-x-1-8-x-11-7-8-Graphite-Gray-DH012/product_VCTDH012>, 2 pages.

* cited by examiner

DISPLAY SYSTEMS AND DEVICES

CROSS REFERENCE TO RELATED APPLICATIONS

This application is a national stage filing under 35 U.S.C. 371 of PCT/US2019/041542, filed 12 Jul. 2019, which claims the benefit of U.S. Provisional Application No. 62/697,453, filed 13 Jul. 2018, the disclosures of which are incorporated by reference in their entireties herein.

TECHNICAL FIELD

The present disclosure generally relates to display systems, display devices, and methods of making and using them. Some exemplary display systems are capable of attaching a display device to a computer monitor.

BACKGROUND

Document holders attach to a computer monitor to position and hold information close to the computer monitor without taking up space on the user's desk. Document holders allow the user to place documents at about the same height and distance as the monitor screen so that the requisite head, neck and eye movement from the document to the monitor is minimal. This positioning facilitates the computer user's easy reference to the document while preventing or minimizing repetitive and awkward to and fro neck movement from the document to the computer monitor or screen, eliminating risk factors such as discomforting head and neck postures and strain on the eyes. Further, with the increasing popularity of standing desks, document holders enable computer user to have the document/document holder move with the desk and/or computer screen or monitor.

SUMMARY

The inventors of the present disclosure recognized some drawbacks of existing document holders and sought to create improved display systems and devices capable of displaying information to a user and attaching to a computer monitor and/or a large format electronic display. For example, the inventors of the present disclosure recognized that no document holders currently known or available offer ease of portability and/or multi-use features. Specifically, the inventors recognized that users would benefit from a display device that could be easily attached to and detached from the computer monitor or large format electronic display (preferably with one hand) and/or taken with the user to meetings, to work from home, etc without loss of the information on or attached to the display device.

In contrast to these goals, many currently available document holders are not easily portable. Instead, they are attached to the computer screen and cannot be easily detached—and certainly cannot be detached with a single motion of one hand. For those document holders that can be detached from the screen (although not easily), the document holders either (1) do not hold documents or information securely in the holder so that the user can take the documents and document holder with them and/or (2) the document holder itself is large, bulky, and/or includes a shelf that projects from the holder that makes transport of documents in the holder cumbersome if not impossible.

The inventors of the present disclosure sought to remedy these disadvantages and create improved display systems and devices capable of displaying information to a user and attaching to a computer monitor and/or large format electronic display.

Some embodiments of the present disclosure relate to a display system, comprising: a display device including at least one magnetic attachment portion; an attachment device capable of attaching the display device to a computer monitor and/or large format electronic device; the attachment device comprising: (1) a first attachment portion that attaches the attachment device to the display device; wherein the first attachment portion includes a magnet and is capable of mating with the magnetic attachment portion of the display device; and (2) a second attachment portion that attaches the attachment device to the computer monitor and/or large format electronic device.

Some embodiments of the present disclosure relate to a method of using a display system, comprising: (1) attaching a first attachment portion of an attachment device to a display device; and (2) attaching a second attachment portion of the attachment device to a computer and/or large format electronic device; wherein the first attachment portion includes a magnet and is capable of mating with a magnetic attachment portion of the display device; and wherein the second attachment portion adhesively or mechanically attaches the display device to the computer and/or large format electronic device.

In some embodiments, the display device includes a whiteboard. In some embodiments, the whiteboard is a superhydrophilic whiteboard. In some embodiments, the display device includes and/or holds at least one of the following articles: a document holder, an electronic device, a document clip, an electronic tablet, phone, computer monitor, electronic writing surface, pressure sensitive writing surface, interactive electronic input device, electronic charging device, adhesive-backed paper, paper notebook, book, picture frame, pin-up board, adhesive-coated display board, magnetic board, lighting surface, acoustic surface, visual privacy surface, mirror surface, and transparent surface, a protective cover, a visual privacy cover, a pens/pencil/eraser holder, a beverage holder, a plant holder, a headphone holder, an earbud holder, an electronic charging device, an adhesive-backed paper dispenser, a tape dispenser, a cord management system, and an electronic power management system.

In some embodiments, the display system is capable of attaching to either the left and/or right side of the computer monitor and/or large format electronic device.

In some embodiments, the attachment device further comprises a connection portion connecting the first attachment portion and the second attachment portion. In some embodiments, the connection portion has a length of between about 0.75 inch and about 3 inches. In some embodiments, the connection portion holds the first and second attachment portions at an angle of between about 0 and about 180 degrees in relation to each other. In some embodiments, the connection portion is slidably connected to the second attachment portion such that the connection portion can slide along the length of the second attachment portion along the y-axis. In some embodiments, the second attachment portion adhesively or mechanically attaches the attachment device to the computer monitor. In some embodiments, the second attachment portion attaches the attachment system to the rear of the computer monitor and/or large format electronic device. In some embodiments, the second attachment portion includes a removable adhesive strip. In some embodiments, the second attachment portion includes nails, screws, hook and loop, other male/ female attachment systems, spring clamp, ratchet clamp, strap, belt, flexible wrap, friction fit, hanging, magnetic system, suction system, and vacuum system.

In some embodiments, the display device can tilt forward and backward relative to the computer monitor and/or large format electronic device and/or can swivel toward the computer monitor and/or large format electronic device. In some embodiments, a user can detach and/or attach the display device to the attachment device with one hand. In some embodiments, the large format electronic device is selected from a group consisting essentially of a television, LCD display screen or device, CRT display screen or device, plasma display screen or device, digital screen or device, high definition screen or device, LED screen or device, OLED screen or device, flat screen display or device, or combinations thereof.

BRIEF DESCRIPTION OF DRAWINGS

The disclosure may be more completely understood in consideration of the following detailed description of various embodiments of the disclosure in connection with the accompanying drawings, which are described as follows.

In the following detailed description, reference may be made to the accompanying set of drawings that form a part hereof and in which are shown by way of illustration several specific embodiments. It is to be understood that other embodiments are contemplated and may be made without departing from the scope or spirit of the present disclosure. For example, FIGS. 1-5 show a computer monitor. However, as is stated herein, any large format display device may be used.

DETAILED DESCRIPTION

The display systems and devices of the present disclosure offer ease of portability and/or multi-use features. In some embodiments, the display device can be easily attached to and detached from a computer screen or monitor and/or a large format display device or screen. In some embodiments, such attachment and/or detachment can be done with a single hand. This ease in attachment and removal facilitates the user taking the display device with the user to meetings, to work from home, to home from work, etc. In some embodiments, the information on or attached to the display device is not easily erased or detached during transport of the display device in the user's purse or briefcase.

When working on a computer screen or monitor and/or a large format display screen or device at home or in an office, individuals often need to access various types of information throughout the day, resulting in desk surfaces and computer screens or monitors becoming cluttered with notes of tasks needing to be accomplished. This clutter and lack of organization make it difficult to focus on important tasks. The display systems and devices of the present disclosure provide a novel and improved way to organize information, notes, tasks by keeping important information in front of a user while also freeing up desk space.

Various embodiments and implementations will be described in detail. These embodiments should not be construed as limiting the scope of the present application in any manner, and changes and modifications may be made without departing from the spirit and scope of the present disclosure. Further, only some end uses have been discussed herein, but end uses not specifically described herein are included within the scope of the present application. As such, the scope of the present application should be determined by the claims. For example, FIGS. 1-5 show use of the device and/or system on a computer monitor or screen. However, the device or system can be used with or attached to any large format electronic device. Some exemplary large format displays or devices include, for example, a computer, a television, LCD display screen or device, CRT display screen or device, plasma display screen or device, digital screen or device, high definition screen or device, LED screen or device, OLED screen or device, flat screen display or device, or combinations thereof.

Figure 1:
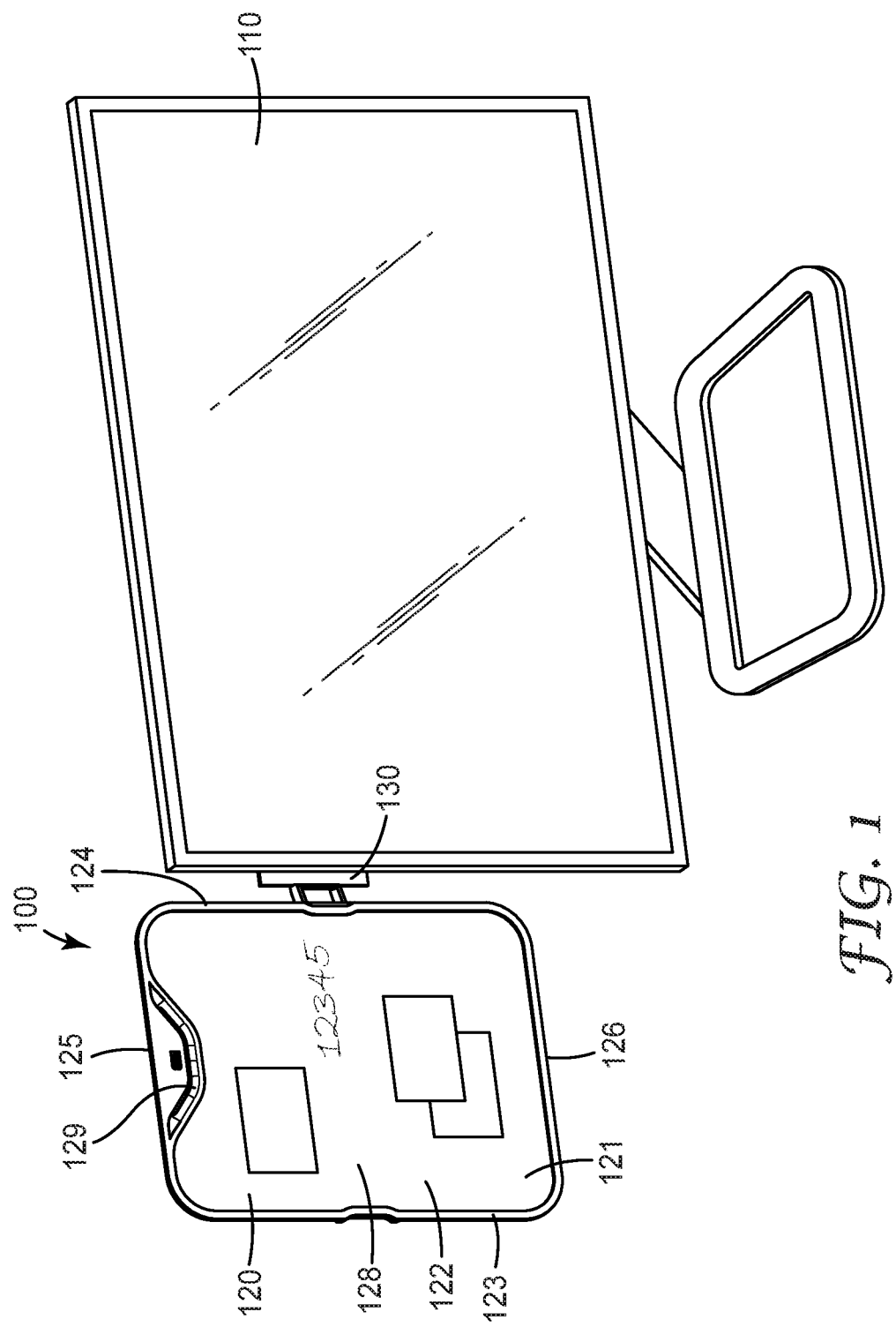
FIG. 1 is a schematic perspective view of an exemplary display system and display device consistent with the teachings herein attached to a computer monitor.
Figure 2:
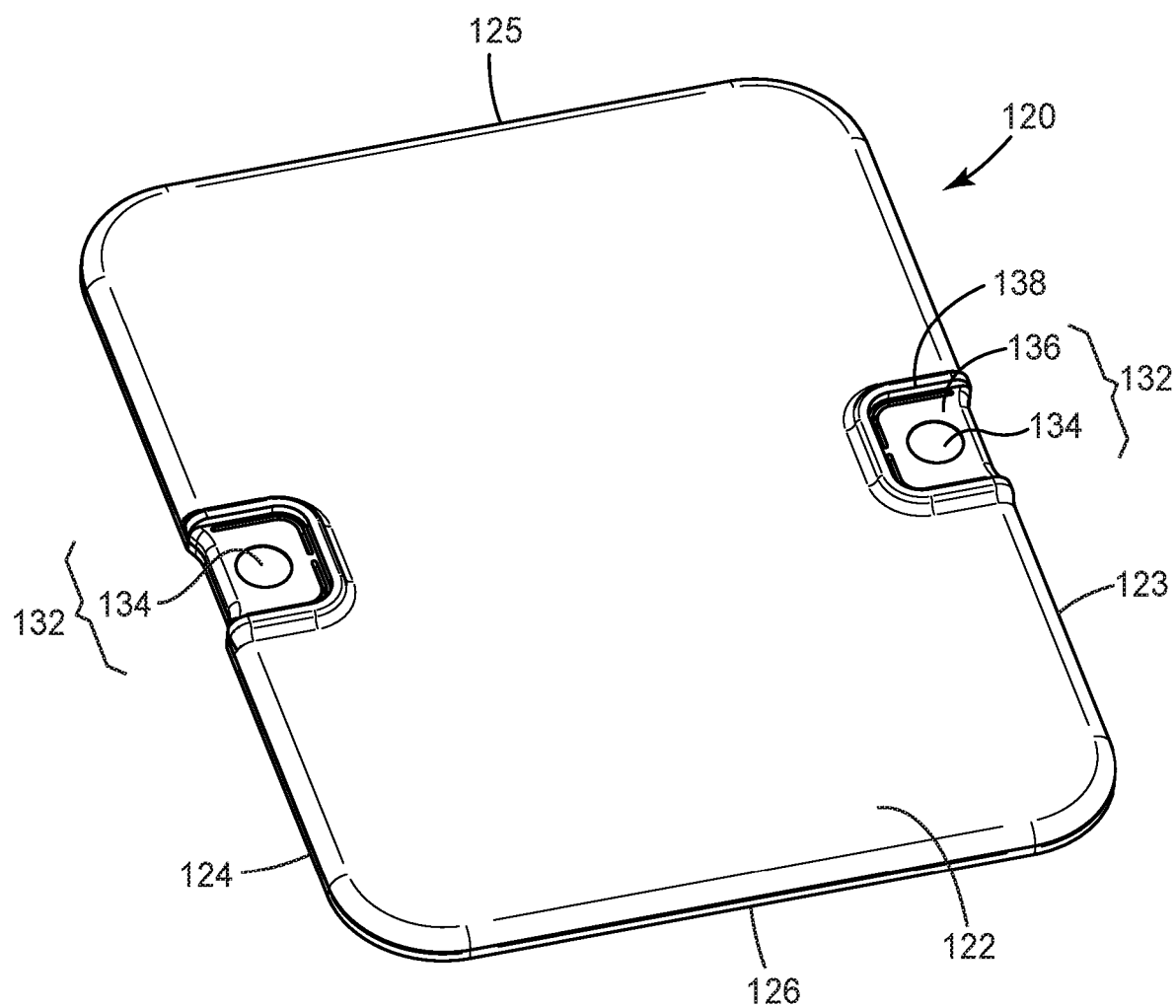
FIG. 2 is a schematic perspective rear view of an exemplary display device consistent with the teachings herein.
Figure 3:
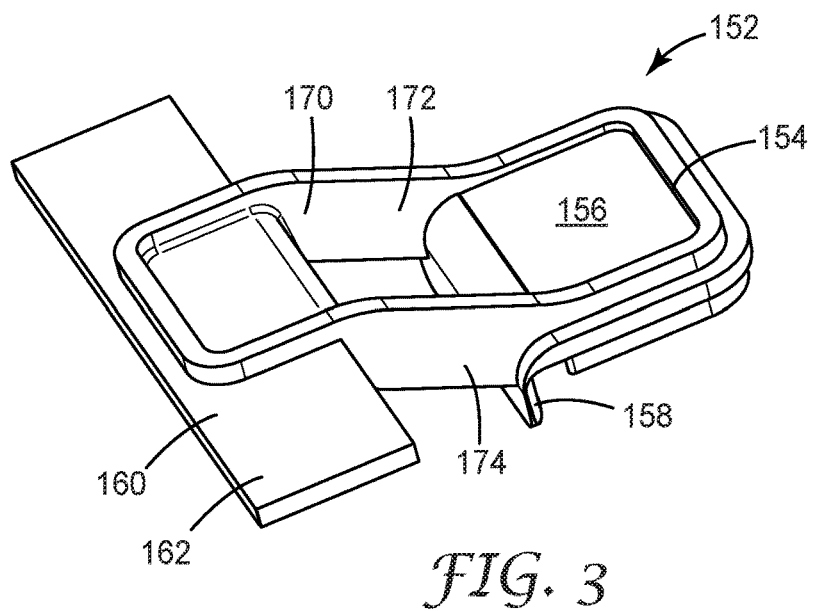
FIGS. 3-5 are respective perspective top, side, and perspective bottom schematic views of an exemplary attachment device consistent with the teachings herein.
Figure 4:
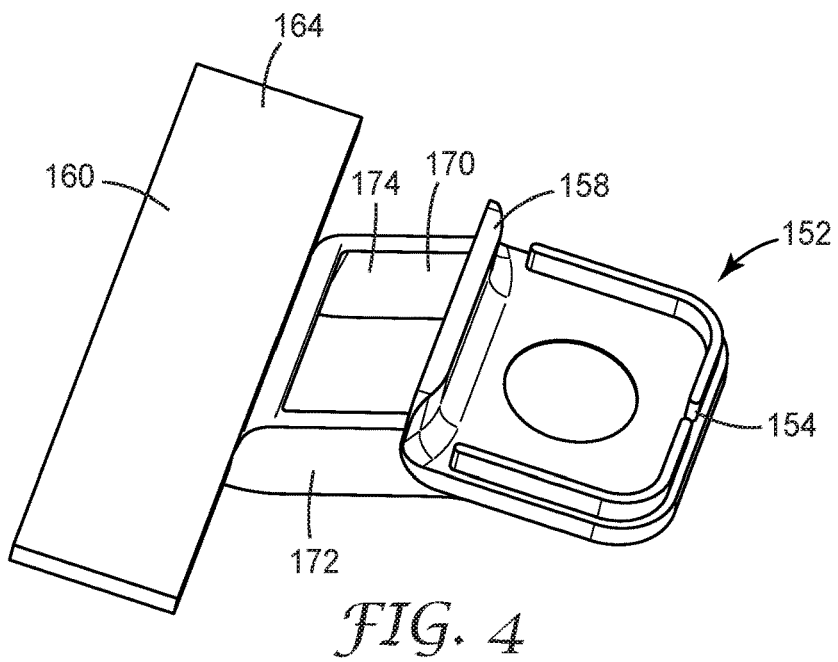
Figure 5:
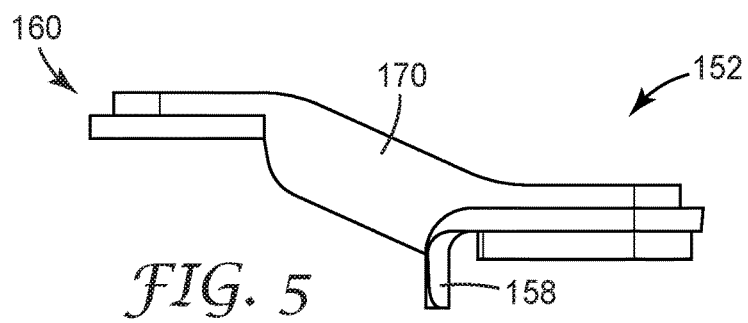

FIGS. 1-5 schematically show one exemplary embodiment of a display system 100 consistent with the teachings herein. Display system 100 includes a display device 120 that connects to computer monitor 110 by way of attachment device 150. FIG. 1 shows the display system 100 attached to a computer monitor 110; FIG. 2 shows the rear side of the display device; and FIGS. 3-5 show various views of the attachment device.

In the exemplary embodiment shown in FIGS. 1-5, display device 120 includes a front side 121 and a backside 122 between which is a display device thickness. Display device 120 also includes first major side 123 (shown as the left-hand side in FIG. 1), a second major side 124 (shown as the right-hand side in FIG. 1), a first minor side 125 (shown as the top side in FIG. 1), and a second minor side 126 (shown as the bottom side in FIG. 1). Display device 120 is shown as generally rectangular, but any desired shape and size may be used. Display device 120 is shown with rounded corners, which makes the device easier and/or more comfortable to handle, but any corner design may be used where the display device includes corners.

Front side 121 of display device 120 includes a whiteboard 128 and a clip 129. FIG. 1 shows adhesive notes attached to whiteboard 128 and writing on whiteboard 128. Rear side 122 of display device 120 of FIGS. 1-5 includes one or more magnetic attachment portions 132 that include each include one or more magnetic features or magnets 134. Display devices including more than one magnetic attachment portions offer the advantage of permitting the user to attach display device 120 in any orientation and/or to either side of the computer monitor. In other embodiments not shown, the display device includes more than two magnetic attachment portions. In other embodiments not shown, the display device includes one or more magnetic attachment portions on the first or second minor sides 125, 126. In some embodiments, magnetic attachment portion(s) 132 has a recessed area 136 (an area having a reduced thickness between the front side 121 and backside 122 of display device 120). In some embodiments, recessed area 136 is at least partially surrounded or bordered by a raised portion or lip 138 (an area that has a thickness that is greater than the average thickness between the front side 121 and backside 122 of display device). Display devices with a recessed area 136 and/or raised portion 138 as part of the magnetic attachment portion(s) 132 offer certain advantages, such as enhanced ease for the user in attaching the display device to the attachment device with a single hand. Another advantage is the ability to include a thinner magnet, resulting in reduced cost.

Attachment device 150 includes a first attachment portion 152 and a second attachment portion 160 connected by a connection portion 170.

First attachment portion 152 is magnetic and attaches to display device 120, specifically to magnet 134 of first attachment portion 152. In the embodiment of FIGS. 1-5, first attachment portion 152 includes an outer rim portion 154 that surrounds at least a portion of a magnet or magnetic portion 156. A lip or stop portion 158 faces second attachment portion 160 and, when in use, acts to alert the user to when first attachment portion 152 is in place with respect to display device 120's magnetic attachment portion 132. Lip or stop portion 158 further helps the ensure correct positioning of first attachment portion 152 with respect to display device 120's magnetic attachment portion 132.

Second attachment portion 160 attaches to computer monitor or screen 110. In the embodiment of FIGS. 1-5, second attachment portion 160 has a flat elongate, generally rectangular area (having a top side 162 and a rear side 164) that can be attached to computer screen or monitor 110 by any known mechanical or adhesive attachment mechanism or device. Some exemplary adhesive attachment mechanisms include adhesive strips, Command™ brand adhesive strips, repositionable adhesive, and permanent adhesive. Where standard adhesive or Command™ brand adhesive strips are used, the adhesive strip is attached to rear side 164 of attachment portion 160 (shown in FIG. 4). Where picture hanging strips are used, one of the pair of strips is attached to the rear side 164 of attachment portion 160 and the other of the pair of strips is attached to the rear of computer monitor or screen 110. Some exemplary mechanical attachment systems include, for example, nails, screws, hook and loop or other male/female attachment systems, spring clamp, ratchet clamps, straps, belts, flexible wraps, friction fits, hanging systems, magnetic systems, suction systems, and vacuum systems.

Connection portion 156 of attachment device 150 of FIGS. 1-5 includes first and second legs 160, 162 that, in some embodiments, are spaced apart from one another. In alternative embodiments, connection portion has a single leg or more than two legs. First and second legs can have any desired length. In some embodiments, they have a length of between about 0.75 inch and about 3 inches. In some embodiments, including the embodiment of FIGS. 1-5, first and second legs 172, 174 hold first and second attachment portions 152, 160 at an angle relative to one another. In some embodiments, the angle is between about 0 to about 180 degrees. In some embodiments, the angle is between about 10 and about 145 degrees. In some embodiments, the angle is between about 20 and about 90 degrees. In some embodiments, the angle is greater than 5 degrees, or 10 degrees, or 15 degrees, or 20 degrees, or 25 degrees, or 30 degrees, etc. In some embodiments, the angle is less than 180 degrees, or less than 170 degrees, or less than 160 degrees, or less than 160 degrees, or less than 150 degrees, or less than 140 degrees, or less than 130 degrees, or less than 120 degrees. Some of the advantages of having first and second legs 172, 174 hold first and second attachment portions 152, 160 at an angle relative to one another is that this permits the display device to be held, in some embodiments, flush with the computer screen or monitor and, in other embodiments, slightly ahead of or behind the computer screen or monitor.

In some embodiments, connection portion 170 of attachment device 150 can slide vertically along the length of second attachment portion 160. In some embodiments, connection portion 170 of attachment device 150 is movable relative to second attachment portion 160 such that the user can move first attachment portion 152 closer to or further from the user (or, in other words, the user can change the angle of display device relative to the computer screen monitor; for example, further in front of or behind the computer screen or monitor). In some embodiments, the wherein the display device can tilt forward and backward relative to the computer monitor.

Display Devices

The display device can be any desired display device. Exemplary display devices include whiteboards, document holders, electronic media or systems (or holders for same) such as, for example, an electronic tablet, phone, computer monitor, electronic writing surface, pressure sensitive writing surface, interactive electronic input device, electronic charging device, etc), adhesive-backed paper, paper notebook, book, picture frame, pin-up board, adhesive-coated display board, magnetic board, lighting surface, acoustic surface, visual privacy surface, mirror surface, and transparent surface. In some embodiments, the display device includes a clip, a protective cover to lay over the paper, a visual privacy cover, a pens/pencil/eraser holder, a beverage holder, a plant holder, a headphone or earbud holder, an electronic charging device, an adhesive-backed paper dispenser, a tape dispenser, a cord management system, and an electronic power management system.

In some preferred embodiments, the display device is or includes a whiteboard 128. The use of a whiteboard has many advantages. Whiteboards are much-loved communication means that permit the user to write and erase easily and quickly. In some embodiments, the whiteboard is a superhydrohilic whiteboard of the types described in, for example, U.S. Pat. No. 9,527,336 and U.S. Patent Publication No. 2013-0164730, both of which are incorporated by reference herein in their entirety. Superhydrophilic whiteboards offer various advantages. Two exemplary advantages are as follows: (1) the writing on them does not smear, which makes it possible for the user to toss the whiteboard into the user's purse or briefcase without risk of smearing and losing the information on the whiteboard; and (2) the user can write on the whiteboard with any type of marker (not just the specific ones meant for whiteboards) and can still cleanly erase the writing. Many other advantages are listed in the patent and patent application listed above and incorporated herein by reference.

The display device can have any desired shape, size, or thickness. In some embodiments, the display device is rectangular, square, rounded, foldable, flexible, modular, extendable, collapsible, layered, or freeform. In some embodiments, the display device has a size that is between about 3 inches and about 14 inches long, between about 6 inches and about 16 inches high, and between about 0.1 inches and about 2 inches thick. In some embodiments, the display device has a shape and size that is similar to a notepad or tablet, which is a familiar size and which can be easily tossed into the user's purse or briefcase after removal from the display system.

Exemplary Methods for Using the Display Systems Described Herein

In some embodiments, the method for using the display systems described herein involves (1) attaching a first attachment portion of an attachment device to a display device; and (2) attaching a second attachment portion of the attachment device to a computer and/or large format display device or screen. The first attachment portion includes a magnet and is capable of mating with a magnetic attachment portion of the display device and the second attachment portion adhesively or mechanically attaches the display device to the computer and/or large format display device or screen.

Exemplary Methods of Mechanically Attaching the Display Device to the Screen/Monitor One exemplary method of installing the display systems described herein to a computer monitor or screen and/or large format display device or screen with a mechanical system is as follows. First, the user attaches the first attachment portion to the side of a computer screen or monitor 110 (or to any large format display device) using a mechanical attachment feature. Next, the user attached the display device to the attachment device.

Exemplary Methods of Adhesively Attaching the Display Device to the Large Format Display Screen:

One exemplary method of installing the display systems described herein to a computer monitor or screen and/or large format display device or screen with adhesive strips, and specifically, with Command™ brand adhesive strips is as follows. First, the user preferably wipes the rear side 134 of second attachment portion 160 and/or the rear side of the computer screen or monitor 110 (or large format display device or screen) with rubbing alcohol. Next, the user obtains the adhesive strip and removes one side of the liner from the adhesive strip(s). The user then attaches the exposed adhesive of the adhesive strip to the rear side 164 of second attachment portion 160. The user then removes the second liner from the adhesive strip and presses the exposed adhesive portion to the rear side of the computer screen or monitor 110 (or large format display device or screen) in the desired location and presses firmly, holding the attachment device in place for about 30 seconds. After waiting approximately 1 hour, the user can then attach the display device to the attachment device.

One exemplary method of installing the display systems described herein to a computer monitor or screen and/or large format display device or screen with picture hanging strips, and specifically with Command™ brand picture hanging strips is as follows. First, the user preferably wipes the rear side 134 of second attachment portion 160 and/or the rear side of the computer screen or monitor 110 (or large format display device or screen) with rubbing alcohol. Next, the user obtains the pair of picture hanging strips and separates the first and second picture hanging strips from one another. Then, the user presses the first and second picture hanging strips together until they click. Next, the user removes one side of the liner and attaches the pair of picture hanging strips on the rear side 164 of second attachment portion 160. After pressing firmly, the user removes the second liner from the picture hanging strip pair and presses the exposed adhesive portion of the picture hanging strip attached to the connection portion 170 to the rear side of the computer screen or monitor 110 (or large format display device or screen) in the desired location. While pressing firmly, the user holds the connection portion 170 in place for approximately 30 seconds. Next, the user can hold the bottom portion of the second attachment portion or the first attachment portion and peel the connection portion from the picture hanging strip attached to the rear of the computer screen or monitor 110 (or large format display device or screen). After waiting approximately 1 hour, the user can then attach the display device to the attachment device.

Removal of the adhesive strip and/or picture hanging strips is simple. One exemplary method involves grasping the tab of the adhesive or picture hanging strip and slowly pulling straight down (or at less than a 30 degree angle to the z axis) to stretch the strip at least 12 inches to release.

The recitation of all numerical ranges by endpoint is meant to include all numbers subsumed within the range (i.e., the range 1 to 10 includes, for example, 1, 1.5, 3.33, and 10).

The terms first, second, third and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

Moreover, the terms top, bottom, over, under and the like in the description and the claims are used for descriptive purposes and not necessarily for describing relative positions. It is to be understood that the terms so used are interchangeable under appropriate circumstances and that the embodiments of the invention described herein are capable of operation in other orientations than described or illustrated herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described embodiments and/or implementations (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the present disclosure can be determined with reference to the appended claims, along with the full scope of equivalents to which such claims are entitled.

Those having skill in the art will appreciate that many changes may be made to the details of the above-described embodiments and implementations without departing from the underlying principles thereof. Further, various modifications and alterations of the present disclosure will become apparent to those skilled in the art without departing from the spirit and scope of the disclosure. The scope of the present application should, therefore, be determined only by the following claims and equivalents thereof.

What is claimed is:

1. A display system, comprising:
a display device including at least one magnetic attachment portion;
an attachment device capable of attaching the display device to a computer monitor and/or large format display device; the attachment device comprising:
a first attachment portion that attaches the attachment device to the display device; wherein the first attachment portion includes a magnet and is capable of mating with the magnetic attachment portion of the display device and wherein the first attachment portion includes an outer rim portion that surrounds at least a portion of the magnet and a stop portion; and
a second attachment portion that attaches the attachment device to the computer monitor and/or large format display device.

2. The display system of claim 1, wherein the display device includes a whiteboard.

3. The display system of claim 2, wherein the whiteboard is a superhydrophilic whiteboard.

4. The display system of claim 1, wherein the display device includes and/or holds at least one of the following articles: a document holder, an electronic device, a document clip, an electronic tablet, phone, computer monitor, electronic writing surface, pressure sensitive writing surface, interactive electronic input device, electronic charging device, adhesive-backed paper, paper notebook, book, picture frame, pin-up board, adhesive-coated display board, magnetic board, lighting surface, acoustic surface, visual privacy surface, mirror surface, and transparent surface, a protective cover, a visual privacy cover, a pens/pencil/eraser holder, a beverage holder, a plant holder, a headphone holder, an earbud holder, an electronic charging device, an adhesive-backed paper dispenser, a tape dispenser, a cord management system, and an electronic power management system.

5. The display system of claim 1, wherein the attachment device further comprises:
a connection portion connecting the first attachment portion and the second attachment portion.

6. The display system of claim 5, wherein the connection portion holds the first and second attachment portions at an angle of between about 0 and about 180 degrees in relation to each other.

7. The display system of claim 5, wherein the connection portion is slidably connected to the second attachment portion such that the connection portion can slide along the length of the second attachment portion along the y-axis.

8. The display system of claim 1, wherein the second attachment portion adhesively or mechanically attaches the attachment device to the computer monitor and/or large format display device.

9. The display system of claim 8, wherein the second attachment portion attaches the attachment system to the rear of the computer monitor and/or large format display device.

10. The display system of claim 8, wherein the second attachment portion includes a removable adhesive strip.

11. The display system of claim 8, wherein the second attachment portion includes nails, screws, hook and loop, other male/female attachment systems, spring clamp, ratchet clamp, strap, belt, flexible wrap, friction fit, hanging, magnetic system, suction system, or vacuum system.

12. The display system of claim 1, wherein the display device can tilt forward and backward relative to the computer monitor and/or large format display device and/or can swivel toward the computer monitor and/or large format display device.

13. The display system of claim 1, where a user can detach and/or attach the display device to the attachment device and/or the computer monitor or large format display device with one hand.

14. A method of using a display system, comprising:
attaching a first attachment portion of an attachment device to a display device;
attaching a second attachment portion of the attachment device to a computer and/or large format display device;
wherein the first attachment portion includes a magnet and is capable of mating with a magnetic attachment portion of the display device;
wherein the first attachment portion includes an outer rim portion that surrounds at least a portion of the magnet and a stop portion; and
wherein the second attachment portion adhesively or mechanically attaches the display device to the computer and/or large format display device.

15. The method of using a display system of claim 14, wherein the display device includes a superhydrophilic whiteboard.

16. The method of using a display system of claim 14, wherein the attachment device further comprises:
a connection portion connecting the first attachment portion and the second attachment portion.

17. The method of using a display system of claim 16, wherein the connection portion holds the first and second attachment portions at an angle of between about 0 and about 180 degrees in relation to each other.

18. The method of using a display system of claim 16, wherein the connection portion is slidably connected to the second attachment portion such that the connection portion can slide along the length of the second attachment portion along the y-axis.

19. The method of using a display system of claim 16, wherein the second attachment portion adhesively or mechanically attaches the attachment device to the computer monitor and/or large format display device.

20. The display system of claim 1, wherein the large format electronic device is selected from a group consisting essentially of a television, LCD display screen or device, CRT display screen or device, plasma display screen or device, digital screen or device, high definition screen or device, LED screen or device, OLED screen or device, flat screen display or device, or combinations thereof.

* * * * *